US00RE34945E

United States Patent [19]

Sayer et al.

[11] E Patent Number: Re. 34,945

[45] Reissued Date of Patent: May 23, 1995

[54] FUEL INJECTION APPARATUS

[75] Inventors: Christopher N. F. Sayer, Ferndale; John R. Outram, Shelley, both of Australia

[73] Assignee: Orbital Engine Company (Australia) Proprietary Limited, Balcatta, Australia

[21] Appl. No.: 809,125

[22] Filed: Dec. 18, 1991

Related U.S. Patent Documents

Reissue of:

[64] Patent No.: 4,844,339
Issued: Jul. 4, 1989
Appl. No.: 167,165
Filed: Mar. 11, 1988

[30] Foreign Application Priority Data

Mar. 13, 1987 [AU] Australia ..... PI0839

[51] Int. Cl.[6] ..... B05B 1/30; F02M 51/06

[52] U.S. Cl. ..... 239/5; 239/585.1; 251/129.19

[58] Field of Search ..... 239/5, 585.1–585.5; 251/129.19

[56] References Cited

U.S. PATENT DOCUMENTS 2,650,617 9/1953 Wasser ..... 251/129.19
2,651,744 9/1953 Acklin et al. ..... 251/129.19
2,698,159 12/1954 Crum ..... 251/129.19
4,662,567 5/1987 Knapp .
4,699,323 10/1987 Rush et al. .
4,726,389 2/1988 Minoura et al. .
4,978,074 12/1990 Weinand .

FOREIGN PATENT DOCUMENTS 559478 9/1923 France ..... 251/129.19
521994 4/1957 Italy ..... 251/129.19

*Primary Examiner*—Andres Kashnikow
*Attorney, Agent, or Firm*—Nikaido, Marmelstein, Murray & Oram

[57] ABSTRACT

A fuel injection apparatus for delivering a metered quantity of fuel to an engine comprising a valve controlled port through which the metered quantity of fuel is delivered to the engine the valve being resiliently urged to a position to close said port. *An* [Electromagnetic means] *electromagnetic element is provided which is* operable when energized to displace said valve member from the closed position to permit delivery of the metered quantity of fuel through the port to the engine. The electromagnetic [means including] *element includes* an armature member movable in a first direction in response to energizing of the electromagnetic [means] *element* to effect the opening of the port. The armature [having] *has* a limited free movement in the first and the opposite directions independent of the valve member when the electromagnetic [means] *means* is not energized and the valve member is in the port closed position.

11 Claims, 1 Drawing Sheet

FUEL INJECTION APPARATUS

Figure 1:
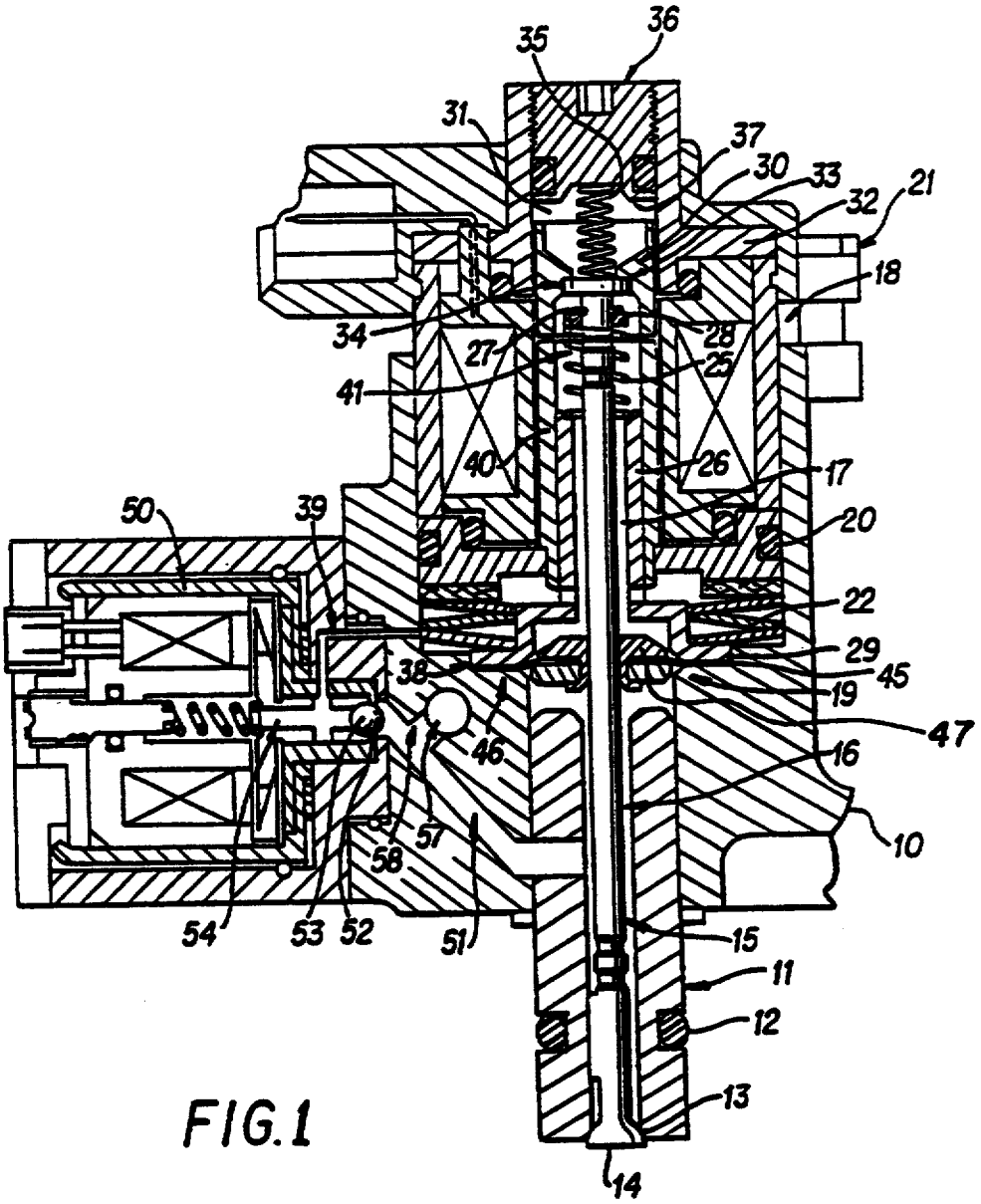

Matter enclosed in heavy brackets [ ] appears in the original patent but forms no part of this reissue specification; matter printed in italics indicates the additions made by reissue.

This invention relates to apparatus for the injecting of an metered quantities of fuel to an internal combustion engine, including such apparatus where the fuel is entrained in air or other suitable gas during injection.

In currently known fuel injecting apparatus, it is customary to use a selectively openable port to regulate, in relation to the engine cycle, the timing of admission of the fuel and/or the period over which the fuel is delivered to the engine. The port is normally controlled by a valve, usually of the pintle or poppet type, with the valve being actuated by a solenoid which is energised under the control of an appropriate electronic circuit. Having regard to the normal speed of operation of modern internal combustion engines, particularly in the automotive and outboard marine areas, the valve controlling the injection of the fuel to an engine is required to operate at a relatively high frequency and with substantial accuracy in regard to the timing of the opening and closing of the valve.

It is therefore the principal object of the present invention to provide, in a fuel injection apparatus for delivering fuel to an internal combustion engine, a valve controlled port and valve actuating mechanism which is reliable in operation and can provide the required accuracy and durability demanded by modern high speed engines.

With this object in view, there is provided a fuel injection apparatus, for delivering a metered quantity of fuel into the air induction system or combustion chamber of an engine comprising a port through which the metered quantity of fuel is delivered, a valve member operable to open and close said port, means resiliently urging said valve member to a position to close said port, and selectively energisable electromagnetic means operable when energised to displace said valve member from a port closed position to permit delivery of the metered quantity of fuel through the port, said electromagnetic means including an armature member movable in a first direction in response to energising of the electromagnetic means to effect said displacement of the valve member to open the port, said armature having limited free movement in said first and the opposite directions independent of the valve member when the electromagnetic means is not energised and the valve member is in the port closed position.

The limited freedom of movement of the armature member in the opposite direction enables the armature member to continue movement in said opposite direction after the valve member has returned to the closed position. This enables the kinetic energy of the armature member, developed as the valve moves to the closed position, to be dissipated at least in part without a direct effect on the valve member.

The continued movement of the armature member can be arrested by, for example, having it strike an abutment whereupon further kinetic energy is dissipated by the impact and the rebounding of the armature member. During the rebound movement, which is in the first direction, further energy is dissipated, and the armature member will again contact the valve member.

The continued movement of the armature member after the valve has reached the closed position, and the impact of the armature member with the abutment both contribute to the energy dissipation of kinetic energy without influencing the state of the valve member. When the valve member is again contact by the armature member, after the rebound movement, there will be little energy available to effect bounce of the valve member.

Conveniently, the electromagnetic means is a solenoid arranged co-axial with the direction of movement of the valve member, which is preferably a poppet valve opening to downstream of the fuel flow.

Preferably the fuel injection apparatus includes a chamber in which a metered quantity of fuel is held, said port through which the fuel is delivered being in the wall of said chamber, with the stem of the valve controlling the port extending across the chamber and through the opposite wall. A flexible diaphragm seal is provided between the valve stem and said opposite wall to permit the relative movement therebetween as the valve opens and closes the port. The diaphragm is sealably secured about the inner periphery to the stem of the valve and about the outer periphery to said opposite wall of the chamber.

Having regard to the flexibility of a diaphragm, there is a minimum of resistance to the movement of the valve stem during the opening and closing of the port. The low resistence nature of the seal between in valve stem and chamber wall contributes to accuracy in the timing of the opening and closing of the port, and the force required to effect the movement of the valve. Also the diaphragm seal is not subject to wear, as are other seals such as 'O' ring seals and the like.

The use of an effective seal between the valve stem and chamber wall enables the solenoid that drives the valve to be effectively sealed from the chamber housing the metered quantity of fuel and from any air or other gas that effects delivery of the fuel from the chamber through the port. In one embodiment the solenoid is located in an area flooded with fuel but isolated form the chamber that receives the metered quantity of fuel. This flooding of the solenoid area protects the metallic components of the solenoid from exposure to water in liquid or vapour form that may promote corrosion of the metallic components. Also desirable damping effects on the free movement of the armature of the solenoid result from the flooding of the solenoid area with fuel.

It is customary to arrange the chamber that holds the metered quantity of fuel co-axial with the valve and valve stem, and the fuel is delivered from a metering device into a conduit extending laterally from the chamber.

When air or another gas is admitted to the chamber to displace a metered quantity of fuel from the chamber for delivery to the engine, it is important that the quantity of fuel metered into the chamber is the quantity delivered to the engine. In particular, if there is not a significant movement of air in the conduit between the fuel metering device and the chamber, fuel can be left there. Any fuel remaining in that conduit can reduce the actual quantity of fuel delivered to the engine relative to the metered quantity delivered into the conduit and hence detract from the engine's performance. This inaccuracy in the quantity of fuel delivered to the engine can be especially significant in small capacity engines, particularly at low fueling levels, such as a low load, low speed operation.

Accordingly, it is proposed to provide in a fuel injection system, having a chamber from which fuel is delivered to an engine, means to supply air to the chamber to displace the fuel therefrom, a conduit communicating a fuel metering device with the chamber and through which fuel delivered by the fuel metering device passes to the chamber, and means to admit air to said conduit adjacent the metering device to convey the fuel in said conduit to the chamber.

The admission of the air to the conduit at or near where the fuel is delivered thereinto, promotes an air flow through the conduit to the chamber, the air carrying with it fuel located in the conduit to be delivered to the engine. If all of the air used to deliver the fuel is delivered otherwise into the chamber, any fuel located in the conduit is not entrained in the air, and so the total of the metered quantity of fuel is not delivered to the engine. Conveniently all of the air required to deliver the fuel is admitted to the conduit adjacent the metering device.

The invention will be more conveniently understood from the following description of one practical arrangement of the fuel injection and metering device with reference to the accompanying drawing:

FIG. 1 is a longitudinal sectional view of the fuel injection and metering device.

Referring to the drawing, the fuel injection and metering apparatus comprises a body 10 having a projecting spigot 11 which in use is received in sealing relationship via the 'O' ring 12 in a bore provided in the cylinder head or cylinder wall of an engine. When the spigot 11 is so located the port 13 is in a position to deliver fuel into the engine combustion chamber when the valve 14 is in the open position as hereinafter described.

By suitable modification to the mounting arrangement this metering and injection device may be fitted to deliver fuel in the induction system of an internal combustion engine.

The valve stem 15, which carries the valve 14, extends co-axially through the fuel chamber 16 in the spigot 11, and the central cavity 17 in the solenoid assembly 18 mounted in the body 10. The diaphragm seal assembly 19 provides a seal between the valve stem 15 and the body 10 so the fuel chamber 16 is isolated from the cavity 17 and the solenoid assembly 18 in general. The solenoid assembly 18 is slidably received in the cavity 17 with the 'O' ring seal 20 located therebetween. The axial position of the solenoid assembly 18 in the cavity 17 is controlled by the clamp bolts 21 and the Belleville (Trade Mark) washers 22 so the axial position of the solenoid relative to the valve stem 15 can be adjusted as hereinafter described.

The valve 14 is held in the position to close the port 13 by the compression spring 25 which is compressed between the spacer sleeve 26 and the spring cap 27, which co-operates with the annular spring clip 28 seated in a peripheral groove in the valve stem 15. The lower end of the spacer sleeve 26 rests on the clamp plate 29 which is received in a recess 38 in the body 10 in which the seal assembly 19 is also located.

The washers 22 sit on the upper face of the clamp plate 29 and when the washers 22 are compressed by the tightening of the clamp bolts 21, the periphery of the flexible diaphragm 45 is pressed against the body.

The armature 30 of the solenoid assembly 18 is of a generally cylindrical form and has freedom for axial movement in the bore 31 in the cover plate 32. The armature 30 has an internal annular shoulder 33 which abuts the pressure pad 34 seated on the upper end of the valve stem 15. The compression spring 35 is located between the pad 34 and the adjustor block 36 threadably received in the extension of the bore 31. The effective spring load holding the valve 14 closed is the difference between the upward force on the valve stem 15 derived from the spring 25 and the downward force on the stem 15 derived from the spring 35. The degree of compression of the spring 25 is fixed by the non-adjustable distance between the spring clip 28 and the upper end of the sleeve 26 and the compression of the spring 35 is controlled by the position of the adjustor block 36. The adjustment of the compression of the spring 35 is effected after the stroke of the armature 30 has been set as hereinafter described.

It will be noted that in the static condition as depicted in the drawing, with the valve 14 closing the port 13, the armature 30 is supported on the pad 34 by the engagement of the pad with the shoulder 33. In this static condition, the lower end of the armature 30 is spaced axially from the solenoid core 40 as indicated by the gap 41, that gap being adjustable by means of the clamp bolts 21 and the Belleville washers 22. It will be appreciated that the gap 41 represents the extent of movement of the valve 14 is opening the port 13 after the solenoid assembly 18 is energised to create a magnetic force which draws the armature 30 downwardly as viewed in FIG. 1 until it abuts the upper end of the core 40. The downward movement of the armature 30 is directly transmitted through the pad 34 to the valve stem 15 to effect the opening movement of the valve 14.

Upon de-energising the solenoid assembly 18, the resultant upward force developed by springs 25 and 35 will move the valve stem 15 upwardly so that the valve 14 again closes the port 13. During this closing movement of the valve 14 kinetic energy is developed by the valve, valve stem and armature as they move upwardly under the influence of the springs. Upon the valve 14 seating in the port 13 upward [movment] *movement* of the valve and valve stem is stopped and the kinetic energy processed by them, being relatively small is substantially dissipated by the impact of the valve with the port. The armature 30 however has substantially more kinetic energy due to the greater mass thereof and continues its upward movement until it contacts the under face 37 of the adjustor block 36, thereby dissipating part at least of the kinetic energy independently of the valve 14 and valve stem 15. Any subsequent rebound of the armature 30 downwardly from the adjustor block 36 will be halted by the shoulder 33 contacting the pad 34 on the end of the valve stem 15 thereby dissipating further the kinetic energy of the armature [3] *30*. The contacting of the shoulder 33 with the pad 34 during the downward rebound movement of the armature 30 may result in a minor degree of movement of the valve 14 away from the port 13. However this movement will be quite small in comparison with the rebound movement that would have occurred in the even that the armature 30 was rigid with the valve stem 15 and did not have the relative freedom of movement above described. Under some operating conditions there may be a further rebound of the armature 30 off the pad 34 again in an upward direction before all the energy is dissipated. In the event of a second rebound there will be negligible effect on the valve 14.

When the injection and metering device is in use the cavity 17 may be flooded with liquid fuel so that the movements of the armature 30 take place with the armature immersed in the liquid fuel, thus providing a damping effect on the movements and contributing to the dissipation of the kinetic energy of the armature upon closing of the valve 14, and hence a reduction in the extent of bouncing of the valve 14 on the port 13. The flooding of the cavity 17 with the liquid fuel also results in the absence of air containing moisture within the cavity and so contributes to the control of corrosion of various components of the mechanism located within the cavity 17. The provision of fuel to flood the cavity 17 is by the passages 38 and 39 in the body 10 that communicate with the fuel circulating through the metering device 50.

Steps must be taken to ensure there is no leakage of fuel from the cavity 17 into the chamber 15, as the latter receives accurately metered quantities of fuel from the fuel metering device 50 for delivery to the engine and any leakage of fuel into or from the chamber 16 would vary the amount of fuel from that so metered. To this end the diaphragm seal assembly 19 is provided incorporating the flexible diaphragm member 45 having an outer peripheral area clamped between the clamp plate 29 and the shoulder 46 in the base of the recess 38 in the body 10 and an inner peripheral area gripped by the clamp disc 47 having a central bore through which the stem 15 extends and is sealably bonded.

The body 10 has mounted on the side thereof the fuel metering device 50 which delivers individually metered quantities of fuel into the passage 51 which is in direct constant communication with the chamber 16. The fuel device 50 is of a known construction and incorporates a port 52 and associated ball valve 53 which is normally held in a position to close the port 52 by the rod 54 operated by a suitable actuating mechanism (not shown in detail). The fuel metering device may be of the form as described in reference to FIG. 4 of the drawings of our U.S. Pat. No. 4,693,224 and [pending] Austrailian patent [application] No. 567037.

The passage 51 and chamber 16 are normally in communication with a supply of compressed air or other suitable gas maintained at a substantial pressure. Gas is supplied from the pressurised source through the duct 57 and open port 58 in the wall of the passage 51 in close proximity to the port 52 of the fuel metering device. When the valve 14 is moved to open the port 13 an airflow will be created which enters through the port 58 into the passage 51 and then travels into and through the chamber 16 and outwardly through the port 13 into the engine combustion chamber or air induction system. The metered quantity of fuel which has previously been delivered from the metering device 50 through the port 52 will be entrained in this air flow and be carried with the air through the port 13 into the engine combustion chamber or air induction system.

As this air enters the passage 51 in close proximity to the point of entry of the fuel into that passage, the air flow established in the passage 51 and chamber 16 upon opening of port 13 will pick up and carry with it substantially all of the metered quantity of fuel delivered by the metering device 50 so as to maintain sameness between the metered quantity of fuel delivered from the metering device 50 and the quantity of fuel delivered to the engine through the port 13. Accordingly, fuel that may otherwise cling to the wall of the passage 51 is entrained in the air flow and effectively carried through the chamber 16 and discharged through the port 13. If the air was admitted to the chamber 16 at a location that did not establish an air flow along the passage 51, fuel in the passage may not be carried into the chamber and be delivered through the port 13.

The claims defining the invention are as follows: We claim:

1. A fuel injection apparatus for delivering a metered quantity of fuel to an engine, comprising:

a port through which the metered quantity of fuel is delivered;

a valve member operable to open and close said port;

biasing means for resiliently urging said valve member in a rearward direction to a position to close said port;

selectively energizable electromagnetic means for displacing said valve member in a forward direction, upon energization, from a port closed position to a port open position to permit the delivery of the metered fuel through the port, wherein said electromagnetic means includes an armature in abutting contact with said valve member, such that upon energization of said electromagnetic means, said armature and valve member move together in the forward direction to open said port, and upon deenergization, said armature has limited free movement in the forward and rearward directions independent from said valve member, when said valve member is in the port closed position.

2. A fuel injection apparatus as claimed in claim 1, including an abutment means independent of the valve member and located in the path of the armature when moving in said rearward direction to limit the extent of free movement of the armature in said rearward direction when the valve member is in the port closed position.

3. A fuel injection apparatus as claimed in claim 2, wherein the valve member, armature and abutment means are co-axially aligned in said forward and rearward directions, said armature having an abutment surface in an opposed relation to the abutment means whereby the extent of said free movement of the armature in each direction is determined by the axial spacing of the abutment means from the abutment surface on the armature when the valve member is in the closed position and the armature is in abutting contact with the valve member.

4. A fuel injection apparatus as claimed in claim 2, including a chamber having said port formed in one wall thereof, means to deliver a metered quantity of fuel into said chamber for delivery to the engine, said valve member including a valve head adapted to sealably co-operate with said port to close the port, a valve stem rigidly secured to said valve head and extending through said chamber and through a wall thereof opposite the port, seal means between the valve stem and the opposite wall to prevent the leakage of fuel therebetween, the biasing means being operably connected to the valve stem to urge the valve stem in said rearward direction to maintain the valve head in sealing relation with the port.

5. A fuel injection apparatus as claimed in claim 4, wherein said electromagnetic means is mounted externally of the chamber and located such that said forward and rearward directions of movement of the armature are co-axial with the valve stem.

6. A fuel injection apparatus as claimed in claim 5, wherein the armature is supported to have free movement in the axial direction between that end of the valve stem external of the [cavity] *chamber* and said abutment means.

7. A fuel injection apparatus as claimed in claim 4, wherein the seal means is an annular diaphragm having the outer periphery thereof secured in fixed sealed relation to the wall of the [cavity] *chamber* and the inner periphery thereof secured in fixed sealed relation to the valve stem.

8. A fuel injection apparatus as claimed in claim 5 or 6, wherein the chamber is formed in a body with the port opening through the body at one end of the chamber, said valve stem extending from the opposite end of the chamber into a cavity formed in said body, the electromagnetic means being housed in said cavity.

9. A fuel injection apparatus as claimed in claim 8, wherein the electromagnetic means is adjustably mounted in the cavity co-axial with the valve stem so that the relative axial disposition therebetween may be adjusted to control the extent of axial movement of the valve stem when the electromagnetic means is energised.

10. A fuel injection apparatus as claimed in claim 9, wherein resilient means are operably interposed between the wall of the cavity and the electromagnetic means to urge the latter axially in said rearward direction, and clamp means are provided to displace the electromagnetic means in said forward direction to effect said adjustment of the relative axial disposition of the electromagnetic means relative to the valve stem.

11. A method of delivering a metered quantity of fuel to an engine comprising:

ejecting the fuel through a port to the engine;

resiliently urging a valve member to a position to close the port;

selectively energizing an electromagnetic means to move an armature member in a forward direction to displace the valve member from the port closed position to permit delivery of the metered quantity of fuel through the port;

selectively de-energizing the electromagnetic means such that the valve member moves to the port closed position and displaces the armature member in the rearward direction, opposite to said forward direction; and halting the movement of the valve member at the port closed position and thereafter allowing the armature member to continue in said rearward direction until stopped by an abutment means independent of the valve member.

* * * * *

UNITED STATES PATENT AND TRADEMARK OFFICE

CERTIFICATE OF CORRECTION

PATENT NO. : Re 34, 945

DATED : May 23, 1995

INVENTOR(S) : Sayer, et al

It is certified that error appears in the above-indentified patent and that said Letters Patent is hereby corrected as shown below:

Title page, [57] Abstract, line 17, delete "means" and insert --element--.

Signed and Sealed this

Twelfth Day of December, 1995

*Attest:*

Bruce Lehman

BRUCE LEHMAN

*Attesting Officer*

*Commissioner of Patents and Trademarks*